C. ALBERTSON.
Breaking Plows.

No. 148,398. Patented March 10, 1874.

WITNESSES:
P. C. Dieterich
Harry C. Scott

INVENTOR,
Calvin Albertson per C. H. Watson & Co
ATTORNEYS.

UNITED STATES PATENT OFFICE.

CALVIN ALBERTSON, OF DALTON, INDIANA.

IMPROVEMENT IN BREAKING-PLOWS.

Specification forming part of Letters Patent No. 148,398, dated March 10, 1874; application filed January 31, 1874.

*To all whom it may concern:*

Be it known that I, CALVIN ALBERTSON, of Dalton, in the county of Wayne and State of Indiana, have invented certain new and useful Improvements in Roller and Breaking Plow Attachment; and do hereby declare that the following is a full, clear, and exact description thereof, reference being had to the accompanying drawings, and to the letters of reference marked thereon, which form a part of this specification.

The nature of my invention consists in the construction and arrangement of a frame and carriage for breaking-plows, which will also roll the plowed ground, as will be hereinafter more fully set forth.

In order to enable others skilled in the art to which my invention appertains to make and use the same, I will now proceed to describe its construction and operation, referring to the annexed drawing, in which—

Figure 1:
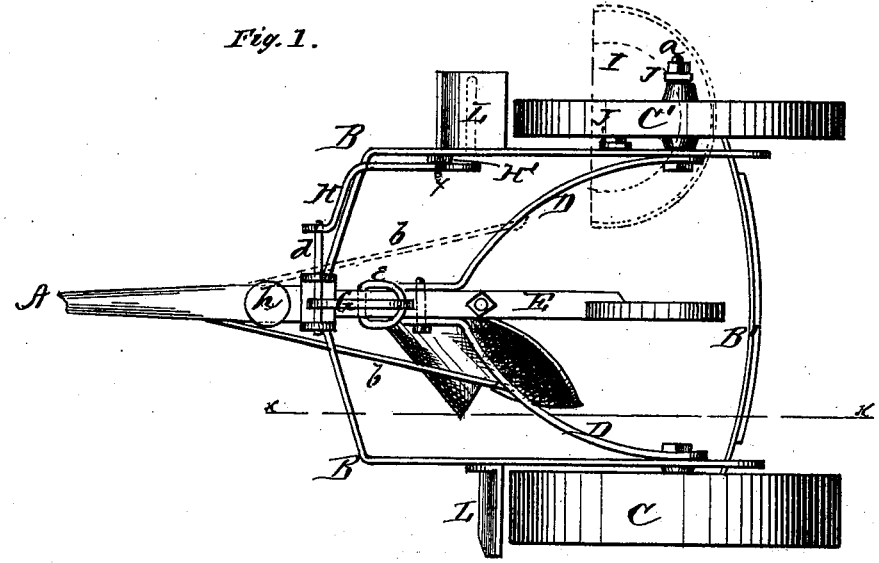
Figure 2:
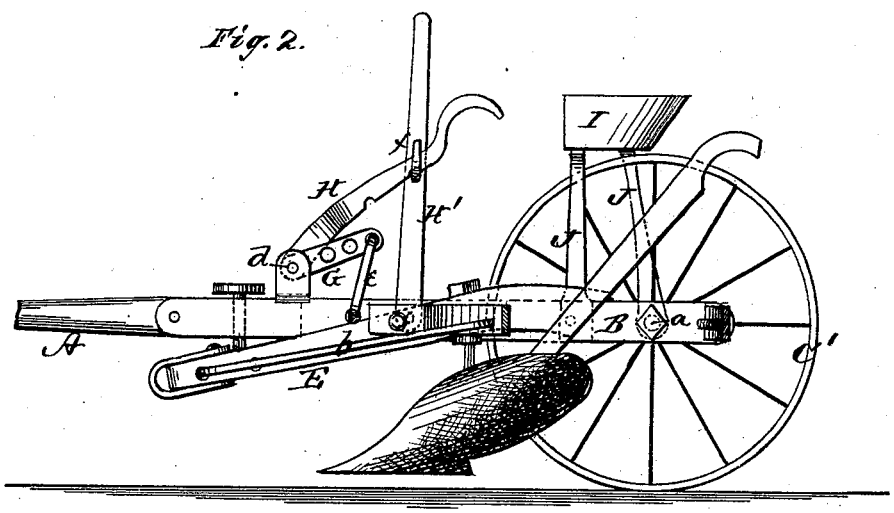

Figure 1 is a plan view of my machine; and Fig. 2 is a longitudinal section of the same through the line $x$ $x$, Fig. 1.

A represents the tongue, to the rear end of which are secured two bars, B B. These bars extend outward in opposite directions for a suitable distance, and then run toward the rear parallel with each other, their extreme rear ends being connected by a cross-bar, B'. From near the rear end of each bar B extends a spindle, $a$, upon which the driving-wheel is placed. C represents the left wheel, and C' the right. The left-hand wheel C is provided with a very broad or wide rim, so as to roll the ground, if desired, while the right-hand wheel C' has a rim of ordinary width. The wheels may be reversed when a right-hand plow is used, they being now arranged for a left-hand plow. The spindles $a$ $a$ project on the inside of the bars B B, and upon their inner ends are attached braces D D, the front ends of which are pivoted to the plow-beam E at any desired point, and, if pivoted some distance in rear of the front end of the beam, the braces have each a rod, $b$, running to the front end, as shown in the drawing. In suitable ears projecting upward from the rear end of the tongue A is placed a short shaft, $d$, from which a perforated arm, G, extends toward the rear, and this arm is, from either of its perforations, by a link, $e$, connected with the plow-beam E. Upon the right hand of the shaft $d$ is attached a lever, H, which is notched on its under side, and rests in a hook, $x$, upon a lever, H', which is pivoted to the right-hand bar B. I represents the driver's seat, supported by means of standards J J, over the wheel C', one of said standards being attached to the bar B, and the other on the outer end of the spindle.

By this construction of the carriage, the tongue works independent of the plow, and through the rear end of the tongue passes a set-screw, $h$, which comes against the top of the plow-beam E at the front end, to regulate the raising of the plow. By means of the levers H H', the plow is raised more or less out of the ground, and held at the desired height by the notches in the lever H dropping down on the hook $x$ of the lever H'. These levers are located within easy reach of the driver, so that he can readily raise and lower the plow, as desired.

By changing the link $e$ in the different holes of the arm G, the raising and lowering of the plow by said levers is regulated, and in raising the plow the front end of the beam strikes against, or comes in contact with, the point of the set-screw $h$, thereby tilting the plow-beam so as to elevate the point of the plow still more.

The driver's seat I may be changed to the opposite side of the machine, in which case the levers H H' must also be changed.

L L represent cleaners for the wheels, attached to the side bars B B, and one of which is formed to act as a foot-rest for the driver.

Having thus fully described my invention, what I claim as new, and desire to secure by Letters Patent, is—

The sulky-frame B B' and tongue A, in combination with braces D, pivoted both on the spindles and plow-beam, rods $b$, and spindles $a$ $a$, when constructed and arranged as and for the purpose herein specified.

In testimony that I claim the foregoing as my own, I affix my signature in presence of two witnesses.

CALVIN ALBERTSON.

Witnesses:
   ISAAC CORY,
   RILEY CHAMNESS.